United States Patent
Armbruster et al.

(10) Patent No.: US 6,304,545 B1
(45) Date of Patent: Oct. 16, 2001

(54) METHOD AND CIRCUIT ARRANGEMENT FOR THE CORRECTION OF PHASE AND/OR FREQUENCY ERRORS IN DIGITAL MULTICARRIER SIGNALS

(75) Inventors: Veit Armbruster, St. Georgen; Claus Muschallik, München, both of (DE)

(73) Assignee: Deutsche Thomson-Brandt GmbH, Villingen-Schwenningen (DE)

( * ) Notice: Subject to any disclaimer, the term of this patent is extended or adjusted under 35 U.S.C. 154(b) by 0 days.

(21) Appl. No.: 09/138,508

(22) Filed: Aug. 24, 1998

(30) Foreign Application Priority Data

Sep. 4, 1997 (DE) .............................. 197 38 780

(51) Int. Cl.[7] .............................. H04J 11/00; H04J 1/00; H03H 7/30; H04K 1/10; H04L 27/36
(52) U.S. Cl. .................. 370/210; 370/203; 370/480; 370/484; 375/230; 375/260; 375/298
(58) Field of Search ................... 370/210, 203, 370/480, 481, 482, 484, 536; 375/260, 261, 298, 230, 231, 232, 364, 367

(56) References Cited

U.S. PATENT DOCUMENTS

| | | | |
|---|---|---|---|
| 5,105,435 | 4/1992 | Stilwell | 375/1 |
| 5,187,711 | * 2/1993 | Hodohara | 371/7 |
| 5,235,612 | 8/1993 | Stilwell et al. | 375/1 |
| 5,285,474 | * 2/1994 | Chow et al. | 375/13 |
| 5,506,836 | 4/1996 | Ikeda et al. | 370/19 |
| 5,506,871 | * 4/1996 | Hwang et al. | 375/230 |
| 5,636,246 | * 6/1997 | Tzannes et al. | 375/260 |
| 5,822,372 | * 10/1998 | Emami | 375/260 |
| 5,901,180 | * 5/1999 | Aslanis et al. | 375/261 |
| 5,940,406 | * 8/1999 | Bolle | 370/484 |

FOREIGN PATENT DOCUMENTS

| | | | |
|---|---|---|---|
| 4193229 C1 | 7/1992 | (DE) | H04B/1/69 |
| 4319217 C2 | 12/1994 | (DE) | H04L/27/32 |
| 19520353A1 | 6/1995 | (DE) | H04L/27/00 |
| 19605704A1 | 2/1996 | (DE) | H04L/27/00 |
| 4441566A1 | 5/1996 | (DE) | H04J/1/02 |

OTHER PUBLICATIONS

Dietmar Wenzel, Digital Audio Broadcasting, published by "ELRAD" 1996, Heft 2, pp. 104–108.
DeBot and Daffara, Digital Terrestrial Television Broadcasting, Philips Journal of Research, vol.50, No.1/2, 1996, pp. 61–77.

* cited by examiner

Primary Examiner—Wellington Chin
Assistant Examiner—M. Phan
(74) Attorney, Agent, or Firm—Joseph S. Tripoli; Joseph J. Laks; Ronald H. Kurdyla

(57) ABSTRACT

In an OFDM system, the so-called self-noise component, which represents that noise component of the respective carrier which is caused by the carrier itself and is mapped onto itself, can be estimated and corrected by shifting all the carriers back in the receiver by multiplication by a factor which is determined by averaging. The so-called external-noise component, which is caused by adjacent carrier interference from the so-called leakage effect of the Fast Fourier transform (FFT2) used in the receiver for demodulation cannot be corrected using this method. In addition to the demodulation FFT, a further FFT (FFT1) is used in the receiver to estimate the self-noise component ($\psi_e$). The estimated self-noise component is used to reproduce the orthogonality between the carriers by correction before the demodulation FFT, to thereby prevent crosstalk. The additional FFT (FFT1) may have a shorter length than the demodulation FFT (FFT2), so that the additional complexity is negligible.

15 Claims, 3 Drawing Sheets a)

b)

c)

METHOD AND CIRCUIT ARRANGEMENT FOR THE CORRECTION OF PHASE AND/OR FREQUENCY ERRORS IN DIGITAL MULTICARRIER SIGNALS

BACKGROUND OF THE INVENTION

The invention relates to a method and a circuit arrangement for the correction of phase and/or frequency errors in digital multicarrier signals which have been transmitted, in particular, using the OFDM method.

The so-called OFDM (Orthogonal Frequency Division Multiplexing) modulation method is used for transmitting terrestrial digital broadcast radio and television signals, for example in accordance with the DAB or DVB-T Standard. This method makes use of a large number of modulated carriers, which are transmitted using frequency-division multiplexers. This results in various advantages, such as improved bandwidth utilization or a reduction in interference effects from multipath reception. However, one disadvantage of the OFDM method in comparison with single-carrier modulation methods is the necessity to reproduce exactly the frequency and phase of the originally transmitted carrier signals. This causes increased sensitivity to frequency errors and phase noise, and thus places more stringent requirements on the frequency and phase purity of the oscillators used for frequency conversion in the receiver.

The phase and frequency errors can be split into two components. The so-called self-noise component in this case represents the noise component of the respective carrier, which is caused by said carrier itself and is mapped onto itself. The so-called external-noise component is, in contrast, caused by adjacent carrier interference from the so-called leakage effect of the Fast-Fourier Transformation (FFT) used in the receiver for demodulation.

A method by means of which the self-noise component of the error can be estimated and corrected has been disclosed in Robertson P., Kaiser S.: "Analysis of the Effects of Phase-Noise in Orthogonal Frequency Division Multiplex (OFDM) Systems", ICC 1995, pages 1652–1657. In this case, a common rotation phase $\psi_e$ is determined in the receiver, after the FFT, by averaging all the carriers. All the carriers are then shifted back through this error amount, which is also called Common Phase Error (CPE), by multiplication by the factor $e^{-j\psi_e}$. This completely, or at least partially, corrects the self-noise component. However, the external-noise component cannot be corrected either by this method or by other known methods, even though this is highly desirable in order to improve the signal-to-noise ratio.

SUMMARY OF THE INVENTION

The invention is based on the object of specifying a method for the correction of phase and/or frequency errors in digital multicarrier signals, which method makes it possible to estimate and correct the total phase error which results from the self-noise and external-noise components. This object is achieved by the method specified in Claim 1.

The invention is based on the further object of specifying a circuit arrangement for use of the method according to the invention. This object is achieved by the circuit arrangement specified in Claim 10.

The correction of the CPE can be expressed by:

$$X_{OFDM.CPE}(n) = FFT\{x_{OFDM.CPE}(k)\} = X_{OFDM}(n) \cdot e^{-j\psi_e} \quad (1)$$

where $X(n)$: carrier
$x(k)$: sample

Subject to the precondition that the angle $\psi_e$ is small, it can be stated as an approximation that:

$$X_{OFDM.CPE}(n) = X_{OFDM}(n) \cdot [\cos(\varphi_e) - j\sin(\varphi_e)] \quad (2)$$

$$\approx X_{OFDM}(n) - j\varphi_e \cdot X_{OFDM}(n)$$

$$\approx X_{OFDM}(n) - jFFT\{\varphi_e \cdot X_{OFDM}(k)\}$$

It can be seen from equation (2) that a correction of the CPE that is carried out after the FFT (frequency domain, running variable n) corresponds approximately to a correction before the FFT (time domain, running variable k). For this reason, the CPE correction can be carried out after the FFT, as described by Robertson et al.

If the intention is to correct the mean frequency error rather than the CPE $\psi_e$, then this can be determined from the integration of $\psi_e$. This correction according to the invention is called "Common Frequency Error" in the following text, or CFE correction for short. The CFE correction is:

$$X_{OFDM.CFE}(n) = FFT\{X_{OFDM.CFE}(k)\} \quad (3)$$

$$= FFT\{X_{OFDM}(k) \cdot e^{-j2(k/N)\varphi_e}\}$$

As can be seen from equation (3), this must be carried out before the FFT. The phase error is then at least theoretically completely suppressed in the CFE correction, so that the received signal is ideally compensated.

In principle, the method according to the invention for the correction of phase and/or frequency errors in digital multicarrier signals comprises the use of a further Fourier transformation to estimate the self-noise component, and the digital signals being corrected depending on the estimated self-noise component.

This correction results in additional computation complexity or labour effort, since an FFT must be carried out twice. Nevertheless, this additional effort is acceptable since the reduction in the phase noise according to the invention makes it possible to reproduce OFDM-transmitted signals even using receivers which have a comparatively poor phase-noise response, such as PAL television receivers.

The Fourier transformation for error processing is preferably carried out before the Fourier transformation for demodulation. This allows particularly good reproduction of the carrier orthogonality, and thus a particularly clear improvement in the crosstalk response.

It is advantageous for the length of the Fourier transformation for error processing to be shorter than the length of the Fourier transformation for demodulation, since this is adequate to estimate the self-noise component, and it reduces the additional computation complexity.

It is furthermore advantageous for the length of the Fourier transformation for demodulation to be N, and for the length of the Fourier transformation for error processing to be N/M, in which case M may be a power of two.

It is particularly advantageous in this case for the complexity for the Fourier transformation for error processing to be reduced by using a 2M radix algorithm.

Furthermore, the digital signals are preferably delayed before they are fed to the Fourier transformation for demodulation, in order to compensate for the calculation time of the Fourier transformation for estimating the self-noise component.

It is furthermore advantageous for either the total phase error or only the self-noise component to be corrected, depending on the estimated self-noise component.

It may likewise be advantageous for a further correction of the self-noise component to be carried out in the Fourier transformation for demodulation.

Finally, it is particularly advantageous for the samples to be multiplied by the complex vector $e^{-j(2\pi f_{err} kT_a) + \psi_e}$ for correction of the self-noise component, or by $e^{-j(2\pi f_{err} kT_a) + 2k\psi e/N}$ for correction of the total phase error, $f_{err}$ being the frequency error between the oscillator and the ideal nominal frequency, N being the number of OFDM carriers, k being a discrete time variable where k=1, 2, 3, ..., N and $T_a$ being the sampling period.

In principle, the circuit arrangement according to the invention comprises, for a method for the correction of phase and/or frequency errors in digital multicarrier signals means for estimating the self-noise component, which means supply a correction signal for the digital multicarrier signals;

a delay stage to which samples of the digital multicarrier signals are fed in order to delay these signals for compensation of the calculation time of the means for estimating the self-noise component;

a frequency mixing unit by means of which adapted phase or frequency signals are produced from the delayed samples with the aid of the correction signal;

transformation means to which the samples of the digital multicarrier signals are fed for a first transformation step, the signals which are transformed by means of the first transformation step being fed to the means for estimating the self-noise component, and to which the adapted phase or frequency signals are fed for a second transformation step, from which signals complex coefficients of the carriers are demodulated by means of the second transformation step.

The transformation means preferably have means for carrying out a Fourier transformation for determining a correction signal and means for carrying out a further Fourier transformation for demodulation of the adapted phase or frequency signals.

Furthermore, in order to determine the correction value, the means for estimating the self-noise component are advantageously fed from a channel estimation unit with information relating to the preceding symbols.

It is particularly advantageous if the means for estimating the self-noise component initially supply a channel correction value and a first phase information value which corresponds to the estimated value of the self-noise component, and furthermore have the following means:

a multiplication unit by means of which the estimated value of the self-noise component is multiplied by a time-dependent running variable in order to produce a second phase information value;

a switching unit by means of which it is possible to switch over between the first phase information value and the second phase information value;

a modulation unit which modulates a complex vector of length L with the first or second phase information value;

a second multiplication unit which uses the channel correction value and the modulated complex vector to determine the correction value which is fed to the frequency mixing unit.

BRIEF DESCRIPTION OF THE DRAWINGS

Exemplary embodiments of the invention will be described with reference to the drawings, in which.

DESCRIPTION OF THE PREFERRED EMBODIMENTS

Figure 1:
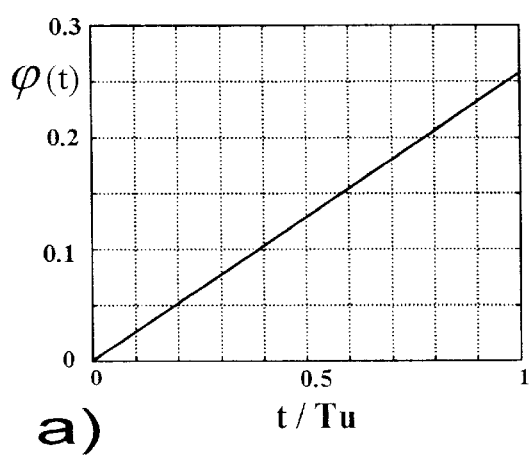
FIG. 1 shows the phase interference and I-Q constellation of an OFDM signal, to be precise a) uncorrected, b) corrected according to the prior art, c) corrected according to the invention.
Figure 1:
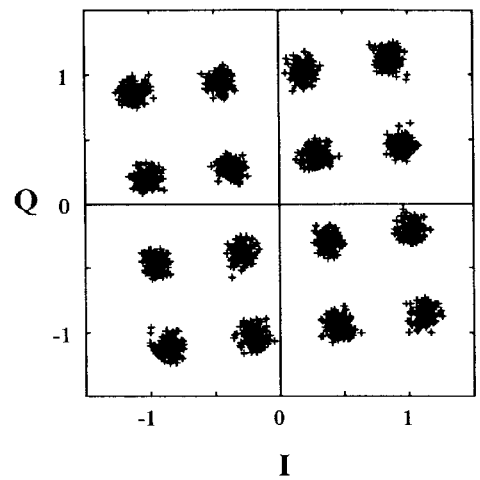
Figure 1:
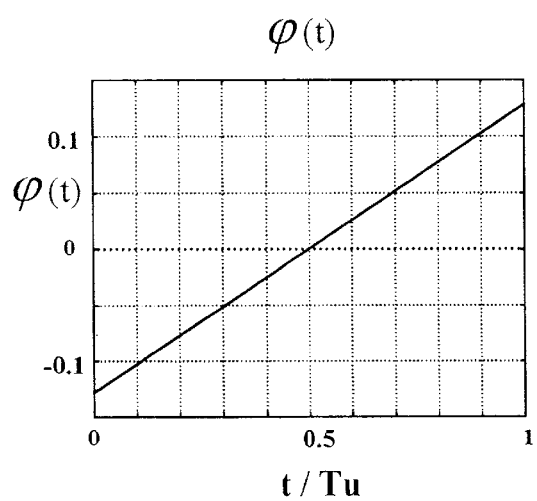
Figure 1:
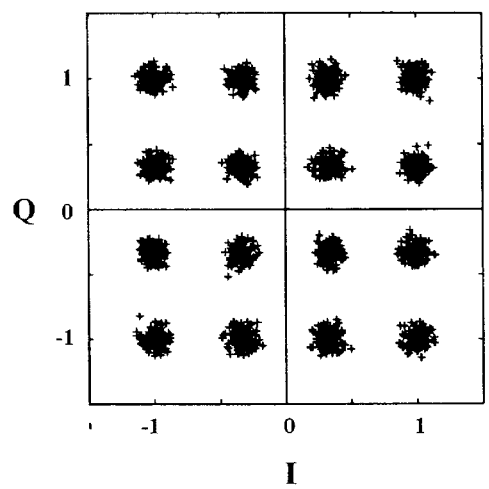
Figure 1:
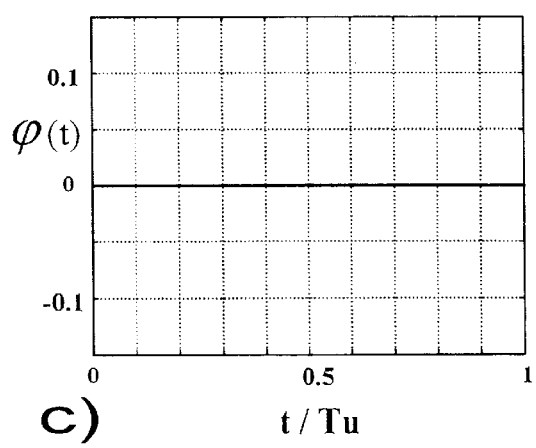
Figure 1:
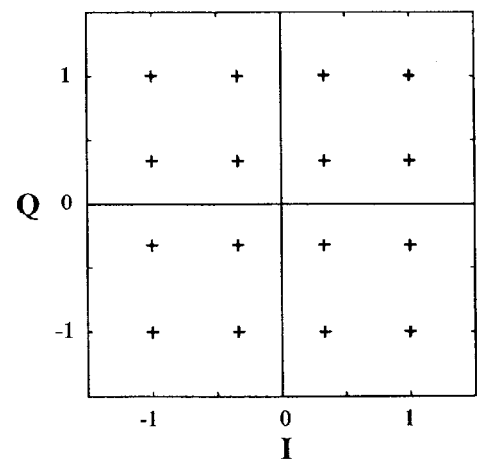

FIG. 1a shows the effect of a phase error on an OFDM signal in an analogue television receiver for quadrature amplitude modulation 16-QAM with N=2048 carriers. The left-hand coordinate system shows the existing phase interference $\psi(t)$ as a function of the time t, normalized to the symbol period Tu. Although the phase interference is in general unknown, it is nevertheless quoted here in order to make the correction process clearer in the following text. In addition to a continuous phase drift, which corresponds to a frequency error, brief sudden phase changes can also be seen here. The right-hand graph shows the arrangement of the individual carriers on an I-Q diagram, the I (in-phase) and Q (quadrature) components being the two components of the respective carrier oscillation, phase-shifted through 90° with respect to one another. The effect of the phase error now includes a common rotation of all the signal spatial points, caused by the self-noise component, and a random inflation of the signal spatial points caused by the external-noise component.

FIG. 1b shows the correction of the signal according to the prior art. The CPE $\psi_e$ is determined by averaging from the OFDM signal, which is then multiplied by the factor $e^{-j\psi_e}$ for correction. This corresponds to shifting the phase error $\psi(t)$ through the angle $\psi_e$ (in the present case, its value is about 0.35 radians), as is shown in the left-hand coordinate system. The correction of the CPE shifts the entire carrier constellation back to its original position (right-hand graph), but the error caused by external components, that is to say the inflation of the signal spatial points, still remains.

FIG. 1c now shows the result of the CFE correction according to the invention. The phase error is considerably reduced here since the continuous phase drift is suppressed by integration of the phase changes, and only the brief sudden phase changes remain. Both the common rotation and some of the inflation of the signal spatial points are thus compensated for.

Figure 2:
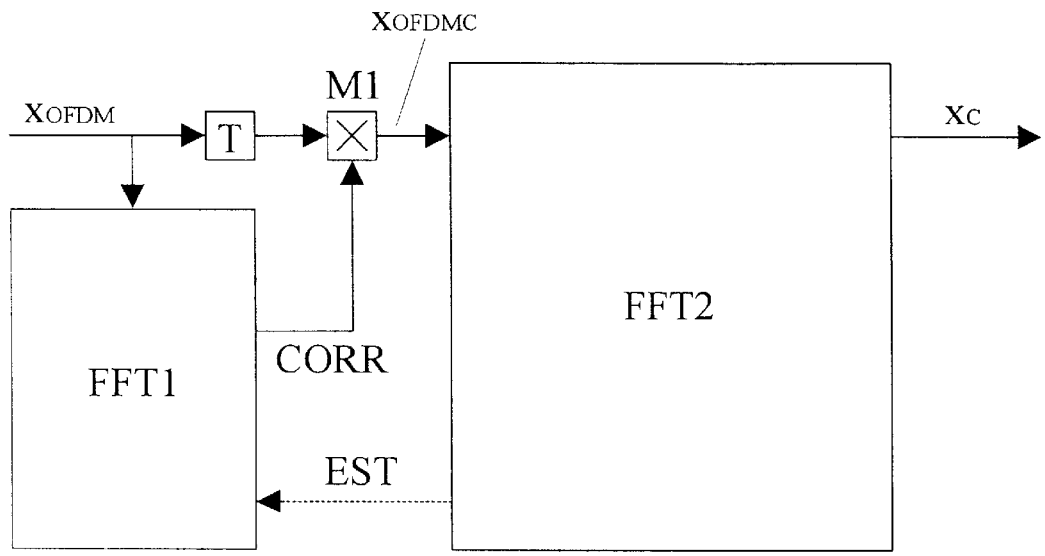
FIG. 2 shows a block diagram of a first circuit arrangement according to the invention for phase error correction.

FIG. 2 shows a block diagram of a circuit arrangement according to the invention for phase error correction. In the OFDM receiver, after frequency conversion of the transmitted OFDM signals to baseband, the signal is sampled in an A/D converter with the sampling period $T_a$. This sampled signal is subject, inter alia, to a phase and frequency error, which has been caused by the radio-frequency oscillators for frequency conversion. Blocks of N samples $x_{OFDM}(k)$ (k=1, 2,3, ..., N) are formed from the sampled signal. These blocks are now first of all delayed by a delay stage T, in order to compensate for the calculation time of the FFT unit FFT1 described in the following text. The phase and frequency adaptation of the signals is then carried out with the aid of a frequency mixing unit M1. The corrected signals $x_{OFDMC}$ are then fed sequentially to an FFT unit FFT2, in which an FFT for demodulation is carried out. In this case, the length of the FFT is normally N, N being the number of OFDM carriers. N complex coefficients $X_c$, with the information of each individual carrier are then obtained after the FFT. The length of the FFT may likewise also be greater than N, for example a multiple of N, if oversampling was additionally carried out at the receiving end, in order to improve the carrier separation and thus the reception response.

The samples $x_{OFDM}$ are also fed to the further FFT unit FFT1, in order to determine the CPE. It is not necessary to use all the carriers to estimate the CPE in this case. Instead of this, a smaller number of coefficients is sufficient for calculating the mean value of the common phase error. This FFT may therefore have a length N/M, so that the complexity of its implementation is considerably reduced. Sensible values in this case are, for example, a demodulator FFT with a length of 8K (8192) and an FFT for error processing with a length of 512. In order to determine the correction value CORR in the FFT unit FFT1, the latter can furthermore be fed from the channel estimation, which in this exemplary embodiment is carried out in the FFT unit FFT2, with information relating to the preceding symbols. Finally, the correction signal CORR is then fed to the frequency mixing unit M1 for phase and frequency adaptation.

Figure 3:
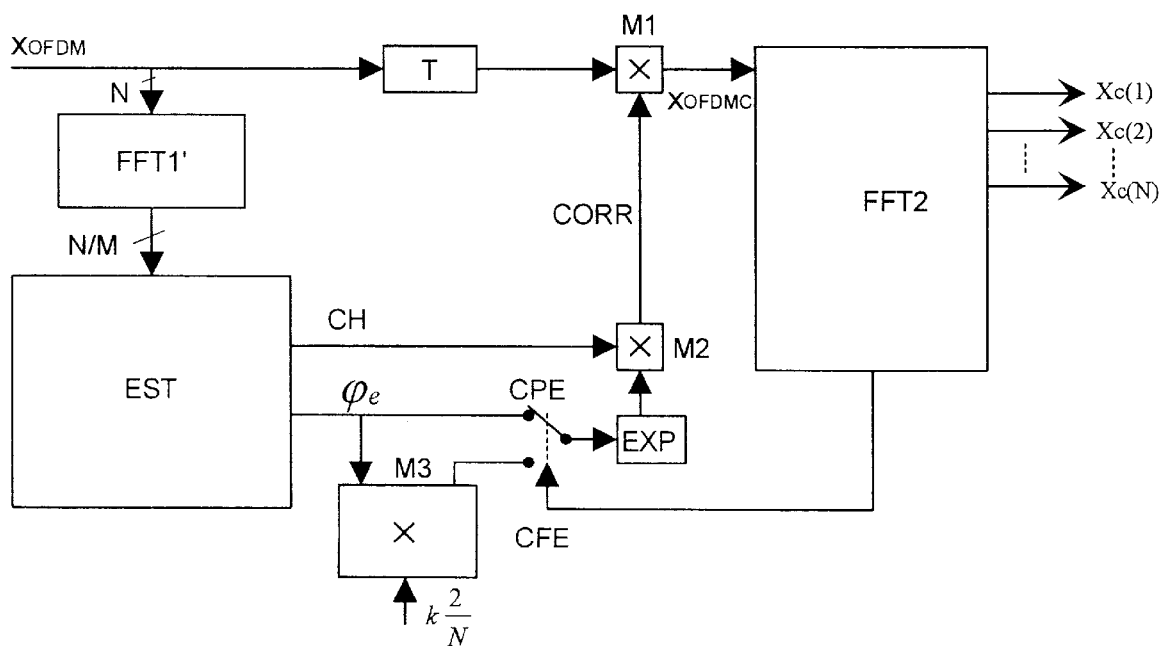
FIG. 3 shows a block diagram of a second circuit arrangement according to the invention.

FIG. 3 shows a further circuit arrangement according to the invention which, after the estimation of the CPE $\psi_e$, it is possible to decide whether a CPE or a CFE correction is carried out. After the shortened FFT in the FFT unit FFT1', a rough channel estimation as well as the determination of the CPE are in this case carried out in a further block EST. The channel estimation provides a value for the frequency error $F_{err}$ between the oscillator and the ideal nominal frequency. This value is used to determine a correction value CH in the form of a complex vector $CH=e^{-j2\pi f_{err}^{kT}a}$, and this is fed to a multiplication unit M2. For the CFE correction, a multiplication unit M3 multiplies the value obtained for the CPE $\psi_e$ by the running variable 2k/N, k being the discrete time variable and N being the number of OFDM carriers. This corresponds to integration of the CPE over time. The phase information obtained, that is to say $\psi_e$ for CPE or $2k\psi_{e/N}$ for CFE, is then used to modulate a complex vector of length L in the modulation unit EXP, which is then likewise fed to the multiplication unit M2. The resultant vector, that is to say $e^{-j[(2\pi f_{err}^{kT}a)+\psi_e]}$ for CPE on $e^{-j[(2\pi f_{err}^{kT}a)+2k\psi_e/N]}$ for CFE is then fed to the frequency mixing unit M1 and is used to correct the delayed OFDM signal. The OFDM signal corrected in this way is then free of the CPE and, in the case of a CFE, has a considerably improved response in terms of frequency errors. Finally, as in the previous exemplary embodiment, the OFDM demodulation of all the carriers is carried out in the second FFT block FFT2. Fine channel estimation that is likewise carried out in this block provides a criterion as to whether the CPE or the CFE correction should be used, the choice of the correction being governed by the phase noise characteristics of the oscillators in the tuner.

Radix-2M algorithms are particularly suitable for reducing the complexity of the FFT for phase error estimation.

Figure 4:
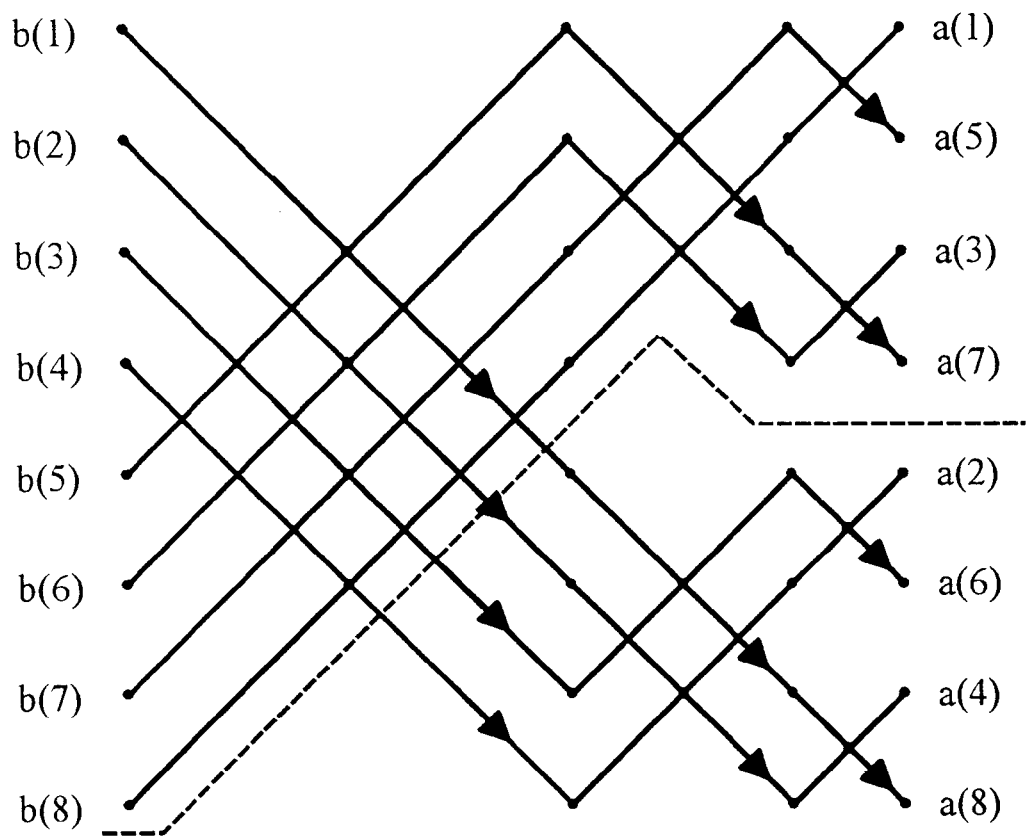
FIG. 4 shows the simplification of an N-FFT into an N/2-FFT with a 2-radix algorithm.

Only every M-th coefficient of the FFT is calculated for this purpose. FIG. 4 shows the way in which such a reduction is organized in the frequency domain for a simple example of 8 samples b(n) in the time domain, which are transformed by the FFT into the frequency domain a(n), only the region bounded by the dashed line, that is to say the odd-numbered coefficients, being calculated. The arrow node points marked by a dot in this case correspond to complex multiplications. For a detailed explanation of the notation used, as well as radix algorithms, reference should generally be made to Kammeyer K. D., Kroschel K.: Digitale Signalverarbeitung, Teubner Studienbücher Elektrotechnik [Digital Signal Processing, Teubner Study Books on Electrical Engineering], Stuttgart, 1992.

The invention may be used for any form of OFDM transmission, but in particular in OFDM receivers for terrestrial digital television or DAB.

What is claimed is:

1. Method for correcting phase or frequency errors in digital multicarrier signals which are transmitted on N different carriers and are subjected in a receiver to Fourier transformation for demodulation, phase noise being composed of a self-noise component and an external-noise component, the self-noise component representing that noise component which is caused by a carrier itself and is mapped onto itself and the external-noise component being caused by adjacent carrier interference, comprising the steps of:

estimating the self-noise component by a further Fourier transformation before said Fourier transformation for demodulation, and correcting the digital signals as a function of the estimated self-noise component.

2. Method according to claim 1, wherein:

the length of the Fourier transformation for estimating the self-noise component may be shorter than the length of the Fourier transformation for demodulation.

3. Method according to claim 2, wherein:

the length of the Fourier transformation for demodulation is N, and the length of the Fourier transformation for estimating the self-noise component is N/M, where M may be a power of two.

4. Method according to claim 3, wherein:

the Fourier transformation for estimating the self-noise component uses a 2M radix algorithm.

5. Method according to claim 1, wherein:

the length of the Fourier transformation for estimating the self-noise component may be shorter than the length of the Fourier transformation for demodulation.

6. Method according to claim 6, wherein:

the length of the Fourier transformation for demodulation is N, and the length of the Fourier transformation for estimating the self-noise component is N/M, where M may be a power of two.

7. Method according to claim 6, wherein:

the Fourier transformation for estimating the self-noise component uses a 2M radix algorithm.

8. Method according to claim 1, including the step of:

delaying the digital signals before they are provided to the Fourier transformation for demodulation to compensate for the calculation time of the Fourier transformation for estimating the self-noise component.

9. Method according to claim 1, wherein:

one of the total phase error or the self-noise component is corrected as a function of the estimated self-noise component.

10. Method according to claim 1, wherein:

an additional correction of the self-noise component is performed by the Fourier transformation for demodulation.

11. Method according to claim 1, wherein:

samples are multiplied by the complex vector $e^{-j[(2\pi f_{err}^{kT}a)+\psi_e]}$ for correction of the self-noise component, or by $e^{-j[(2\pi f_{err}^{kT}a)+2k\psi_e/N]}$ for correction of the total phase error, where:

$f_{err}$ is the frequency error between an oscillator frequency and the ideal nominal frequency, N is the number of OFDM carriers, k is a discrete time variable where k=1, 2, 3, ..., N and $T_a$ is a sampling period.

12. Circuit arrangement for the correction of phase or frequency errors in digital multicarrier signals, comprising:

means for estimating a self-noise component, said means supplying a correction signal for the digital multicarrier signals;

a delay stage to which samples of the digital multicarrier signals are provided in order to delay these signals for compensation of the calculation time of the means for estimating the self-noise component;

a frequency mixing unit by means of which adapted phase or frequency signals are produced from the delayed samples in response to the correction signal;

transformation means to which the samples of the digital multicarrier signals are provided for a first transformation step, the transformed signals from the first transformation step being provided to the means for estimating the self-noise component, and to which the adapted phase or frequency signals are provided for a second transformation step, from which signals complex coefficients of the carriers are demodulated by means of the second transformation step, wherein the transformation means have means for carrying out a Fourier transformation for determining the correction signal and means for carrying out a further Fourier transformation for demodulation of the adapted phase or frequency signals.

13. Circuit arrangement according to claim 12, wherein, the means for estimating the self-noise component are provided from a channel estimation unit with information relating to preceding symbols, to determine the correction signal.

14. Circuit arrangement according to claim 12, wherein the means for estimating the self-noise component initially supply a channel correction value and a first phase information value which corresponds to the estimated value of the self-noise component, and further includes:

a multiplication unit for multiplying the estimated value of the self-noise component by a time-dependent running variable to produce a second phase information value;

a switching unit for switching between the first phase information value and the second phase information value;

a modulation unit for modulating a complex vector of length L with the first or second phase information value; and a second multiplication unit responsive to the channel correction value and to the modulated complex vector to determine the correction signal.

15. Circuit arrangement according to claim 12, wherein, the means for estimating the self-noise component receives information from a channel estimation unit including information relating to preceding symbols.

* * * * *